US011636175B2

(12) United States Patent
Hamamura et al.

(10) Patent No.: US 11,636,175 B2
(45) Date of Patent: *Apr. 25, 2023

(54) SELECTION OF PAULI STRINGS FOR VARIATIONAL QUANTUM EIGENSOLVER

(71) Applicant: INTERNATIONAL BUSINESS MACHINES CORPORATION, Armonk, NY (US)

(72) Inventors: Ikko Hamamura, Kyoto (JP); Takashi Imamichi, Bunkyo-ku (JP); Rudy Raymond Harry Putra, Yokohama (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/672,370

(22) Filed: Feb. 15, 2022

(65) Prior Publication Data

US 2022/0171828 A1 Jun. 2, 2022

Related U.S. Application Data

(63) Continuation of application No. 16/284,493, filed on Feb. 25, 2019, now Pat. No. 11,275,816.

(51) Int. Cl.
*G06N 10/00* (2022.01)
*G06F 17/16* (2006.01)

(52) U.S. Cl.
CPC ............. *G06F 17/16* (2013.01); *G06N 10/00* (2019.01)

(58) Field of Classification Search
CPC ........ G06N 10/00; G06N 10/20; G06N 10/40; G06N 10/60; G06N 10/70; G06N 10/80; G06F 17/16
See application file for complete search history.

(56) References Cited

U.S. PATENT DOCUMENTS

| 2017/0351967 | A1 | 12/2017 | Babbush et al. | |
| 2019/0378032 | A1* | 12/2019 | Kliuchnikov | .......... G06N 10/00 |
| 2020/0057957 | A1* | 2/2020 | Johnson | ................. G06N 10/40 |

(Continued)

OTHER PUBLICATIONS

Gilyen, A. et al., "Optimizing quantum optimization algorithms via faster quantum gradient computation" arXiv:1711.00465v3 (Apr. 2018) pp. 1-60.

(Continued)

*Primary Examiner* — Markus A. Vasquez
(74) *Attorney, Agent, or Firm* — Tutunjian & Bitetto, P.C.; Erik Johnson

(57) ABSTRACT

VQE is accelerated by performing receiving a qubit Hamiltonian representing a linear combination of a plurality of Pauli strings. Selecting, among the plurality of Pauli strings, one or more Pauli strings that have less influence than a threshold on an eigenvalue of the qubit Hamiltonian. Grouping, based on joint measurability, the unselected Pauli strings among the plurality of Pauli strings into a plurality of groups of jointly measurable Pauli strings Determining that one or more of the selected one or more Pauli strings is jointly measurable with Pauli strings in one of the plurality of groups And adding one or more of the selected one or more Pauli strings to the one of the plurality of groups.

20 Claims, 12 Drawing Sheets

(56) References Cited

U.S. PATENT DOCUMENTS

2020/0104740 A1* 4/2020 Cao .................. G06N 5/003

OTHER PUBLICATIONS

Wang, D. et al., "A Generalised Variational Quantum Eigensolver" arXiv:1802.00171v2 (Jun. 2018) pp. 1-10.
Zhu, G. et al., "Hardware-efficient fermionic simulation with a cavity-QED system" arXiv:1707.04760v2 (Mar. 2018) pp. 1-20.
Kandala, A. et al., "Hardware-ecient Variational Quantum Eigensolver for Small Molecules and Quantum Magnets" arXiv:1704.05018v2 (Oct. 2017) pp. 1-24.
Peruzzo, A. et al., "A variational eigenvalue solver on a photonic quantum processor" Nature Communications (Jul. 2014) pp. 1-7, vol. 5, No. 4213.
McClean, J. et al., "The theory of variational hybrid quantum-classical algorithms" New Journal of Physics (Feb. 2016) pp. 1-23, vol. 18.
Bravyi, S. et al., "Tapering off qubits to simulate fermionic Hamiltonians" arXiv:1701.08213v1 (Jan. 2017) pp. 1-15.
Moll, N. et al., "Quantum optimization using variational algorithms on near-term quantum devices" Quantum Science and Technology (Jun. 2018) pp. 1-18, vol. 3, No. 030503.
List of IBM Patents or Patent Applications Treated as Related dated Feb. 15, 2022, 2 pages.

* cited by examiner

SELECTION OF PAULI STRINGS FOR VARIATIONAL QUANTUM EIGENSOLVER

BACKGROUND

Technical Field

The present invention relates to selection of Pauli strings for Variational Quantum Eigensolver.

Description of the Related Art

Quantum computing has been developed for handling significantly increased computation amounts. For example, Variational Quantum Eigensolver (or VQE) is known as a quantum/classical hybrid algorithm for calculating eigenvalues in quantum chemistry. However, VQE statistically processes results of a number of quantum computations, and thus consumes many resources.

SUMMARY

According to an aspect of the present invention, provided is a computer-implemented method, including receiving a qubit Hamiltonian representing a linear combination of a plurality of Pauli strings; selecting, among the plurality of Pauli strings, one or more Pauli strings that have less influence than a threshold on an eigenvalue of the qubit Hamiltonian; grouping, based on joint measurability, the unselected Pauli strings among the plurality of Pauli strings into a plurality of groups of jointly measurable Pauli strings; determining that at least one of the selected one or more Pauli strings is jointly measurable with Pauli strings in one of the plurality of groups; and adding the at least one of the selected one or more Pauli strings to the one of the plurality of groups.

The foregoing aspect may also include an apparatus configured to perform the computer-implemented method, and a computer program product storing instructions embodied on a computer-readable medium or programmable circuitry, that, when executed by a processor or the programmable circuitry, cause the processor or the programmable circuitry to perform the method. The summary clause does not necessarily describe all features of the embodiments of the present invention. Embodiments of the present invention may also include sub-combinations of the features described above.

DETAILED DESCRIPTION

Hereinafter, example embodiments of the present invention will be described. The example embodiments shall not limit the invention according to the claims, and the combinations of the features described in the embodiments are not necessarily essential to the invention.

Figure 1:
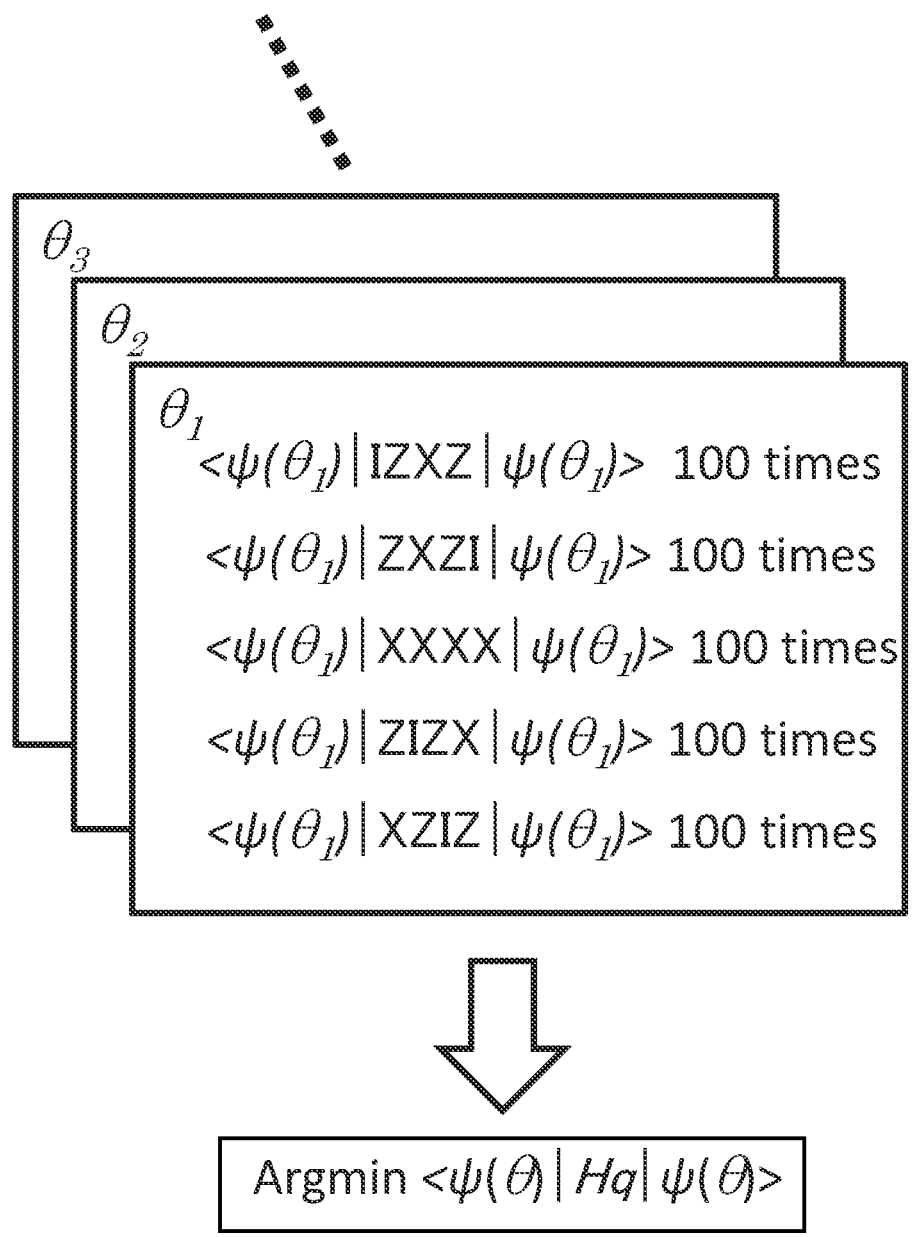
FIG. 1 shows an exemplary process of VQE.

FIG. 1 shows an exemplary process of VQE. VQE may compute an eigenvector and/or an eigenvalue of a qubit Hamiltonian in a Schrodinger equation. For this purpose, VQE may identify $\theta$ for minimizing an expectation value $<\psi(\theta)|H_q|\psi(\theta)>$. "Quantum computer" may refer to a dedicated quantum computer, or a hybrid type in which a quantum circuit is incorporated in a classical computer.

For example, the VQE first calculates an expectation value $<\psi(\theta)|H_q|\psi(\theta)>$ for $\theta_1$, which is an initial $\theta$. The qubit Hamiltonian $H_q$ is expressed as a linear combination of an identity operator I and a tensor product of Pauli operators ($\sigma_x$, $\sigma_y$, and $\sigma_z$). Such a tensor product is also referred to as a Pauli string.

Here, an example of a qubit Hamiltonian $H_q$, including a Pauli string IZXZ, a Pauli string ZXZI, a Pauli string XXXX, a Pauli string ZIZX, and a Pauli string IZXZ, is used. In this example, the qubit Hamiltonian $H_q$ is expressed as shown below.

$$H_q = aIZXZ + bZXZI + cXXXX + dZIZX + eIZXZ \qquad \text{Expression 1}$$

Here, X, Y, and Z respectively represent the Pauli operators $\sigma_x$, $\sigma_y$, and $\sigma_z$, and "a," "b," "c," d:
and "e" represent coefficients.

The VQE divides the expectation value $<\psi(\theta)|H_q|\psi(\theta)>$ into Pauli strings to perform the calculation. For example, in order to calculate the expectation value obtained from $\theta_1$, each of $<\psi(\theta_1)|IZXZ|\psi(\theta_1)>$, $<\psi(\theta_1)|ZXZI|\psi(\theta_1)>$, $<\psi(\theta_1)|XXXX|\psi(\theta_1)>$, $<\psi(\theta_1)|ZIZX|\psi(\theta_1)>$, and $<\psi(\theta_1)|XZIZ|\psi(\theta_1)>$ is calculated, as shown in FIG. 1.

The calculation of $<\psi(\theta_1)|IZXZ|\psi(\theta_1)>$ is performed many times (e.g., 100 times) for $\theta_1$. The calculation of $<\psi(\theta_1)|IZXZ|\psi(\theta_1)>$ is performed by a quantum computer using quantum calculations, but the results of each trial are obtained stochastically. Therefore, by performing the calculation many times for the Pauli string IZXZ, the result of $<\psi(\theta_1)|IZXZ|\psi(\theta_1)>$ is obtained statistically.

In the example of FIG. 1, the quantum computer calculates five types of Pauli strings for $\theta_1$ 100 times each (i.e. a total of 500 calculations). Next, in a similar manner, the quantum calculation is performed many times for $\theta_2$, which is obtained by updating $\theta$, and an expectation value is calculated. Furthermore, $\theta$ is sequentially updated and corresponding expectation values are calculated. In this way, with the VQE, the minimum value of the expectation value $<\psi(\theta)|H_q|\psi(\theta)>$ is searched by updating $\theta$.

In other words, the VQE may be regarded as having three-level loops. In the three-level loops, a first loop (which is an outermost loop) performs the update of $\theta$, the second loop (which is a middle loop) statistically calculates the expectation value for each Pauli string, and the third loop performs quantum calculation of the Pauli strings one time each.

Figure 2:
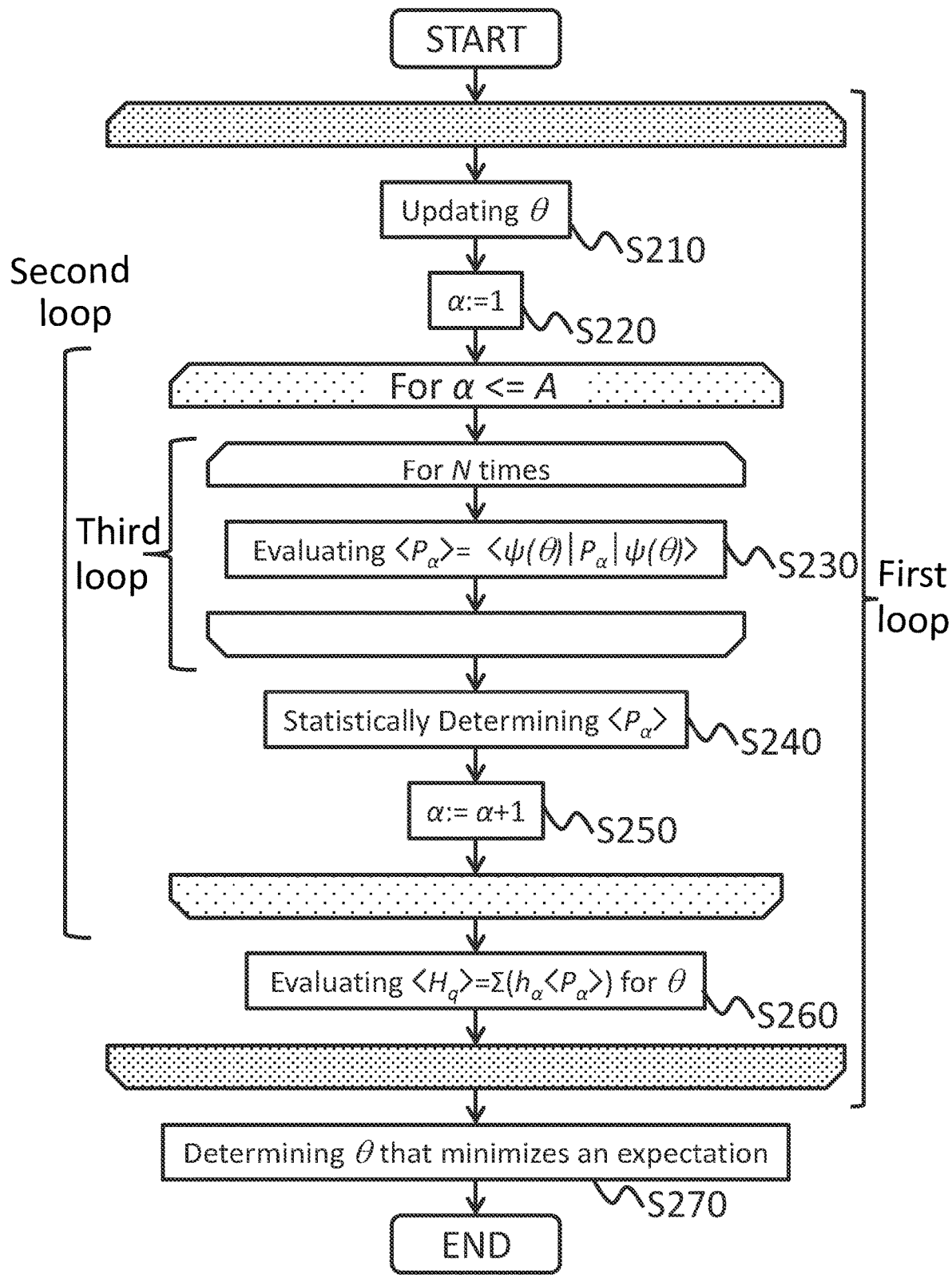
FIG. 2 shows an exemplary operational flow of VQE.

FIG. 2 shows the process flow of the VQE. The quantum computer may execute the VQE by performing the processes of S210 to S270 shown in FIG. 2. Here, S210 to S260 correspond to the first loop, S230 to S250 correspond to the second loop, and S230 corresponds to the third loop.

First, at S210, the quantum computer updates $\theta$. Here, $\theta$ may be a parameter identifying the wave function $\psi$. For example, $\theta$ includes one or more types of functions contained in $\psi$, a coefficient of each function, and values designating adjustment terms or the like. As an example, $\theta$ may be a vector including integers and/or real numbers.

At the first performance of S210, the quantum computer may set the designated $\theta$, or $\theta$ may be determined randomly. At the second and following performances of S210, the quantum computer may set a $\theta$ for which reduction of the expectation value is predicted, based on a known algorithm such as derivative-free optimization methods.

At S220, the quantum computer initializes $\alpha$. Here, a may be a variable designating the Pauli string $P_\alpha$. For example, the Pauli string $P_1$ corresponding to the time when $\alpha=1$ may be IZXZ, and the Pauli strings $P_2$ to $P_5$ respectively corresponding to the times when $\alpha=2$ to $\alpha=5$ may be ZXZI, XXXX, ZIZX, and XZIZ.

Next, at S230, the quantum computer performs a quantum calculation of the Pauli string corresponding to $\alpha$. For example, the quantum computer performs the quantum calculation of the expectation value $<P_{60}>=<\psi(\theta)|P_\alpha\psi(\theta)>$ one time. As an example, when $\alpha=1$ at step S230, the quantum computer performs the calculation of $<\psi(\theta)|IZXZ|\psi(\theta)>$ one time. The quantum computer performs the quantum calculation of S230 a predetermined number N of times (e.g., 100 times) in the third loop.

After the process of the third loop, at S240, the quantum computer statistically determines the expectation value of the Pauli string corresponding to $\alpha$. For example, when $\alpha=1$, the quantum computer calculates a statistical quantity (e.g., an average value, a median value, or a most numerous numerical value) of N calculation results of $<\psi(\theta)|IZXZ|\psi(\theta)>$, and outputs the result as the calculation result of the expectation value $<P_\alpha>$.

Next, at S250, the quantum computer updates $\alpha$. For example, the quantum computer adds 1 to $\alpha$. After this, if $\alpha$ is less than or equal to a predetermined number (e.g., 5), the quantum computer again performs the process of the third loop, and if $\alpha$ a is not less than or equal to the predetermined number, the quantum computer may end the process of the second loop and perform the process of S260.

At S260, the quantum computer calculates the expectation value of the qubit Hamiltonian for the current $\theta$. For example, the quantum computer calculates the expectation value $<H_q>$ using $\Sigma(h_\alpha<P_\alpha>)$. Here, $h_\alpha$ may be a coefficient for each Pauli string, and corresponds to "a" to "e" in Expression 1, for example. After this, if an end condition (e.g., the ending of the update of $\theta$ a prescribed number of times, no further improvement of the expectation value $<H_q>$ being realized, or the like) is satisfied, the quantum computer performs the process of S270, and if this end condition is not satisfied, the quantum computer returns to the process of S210.

At S270, the quantum computer determines the minimum expectation value $<H_q>$ and the $\theta$ that yields this minimum expectation value $<H_q>$, and outputs these values.

In this way, with the VQE, the minimum expectation value $<H_q>$ is determined by performing the process of the three iterations in the first to third loops. Here, if as many of Pauli strings as possible are processed together, the processes of the second loop can be made more efficient.

According to embodiments of the present invention, an apparatus may improve efficiency of computation of the second loop in VQE by utilizing an influence of each Pauli string.

Figure 3:
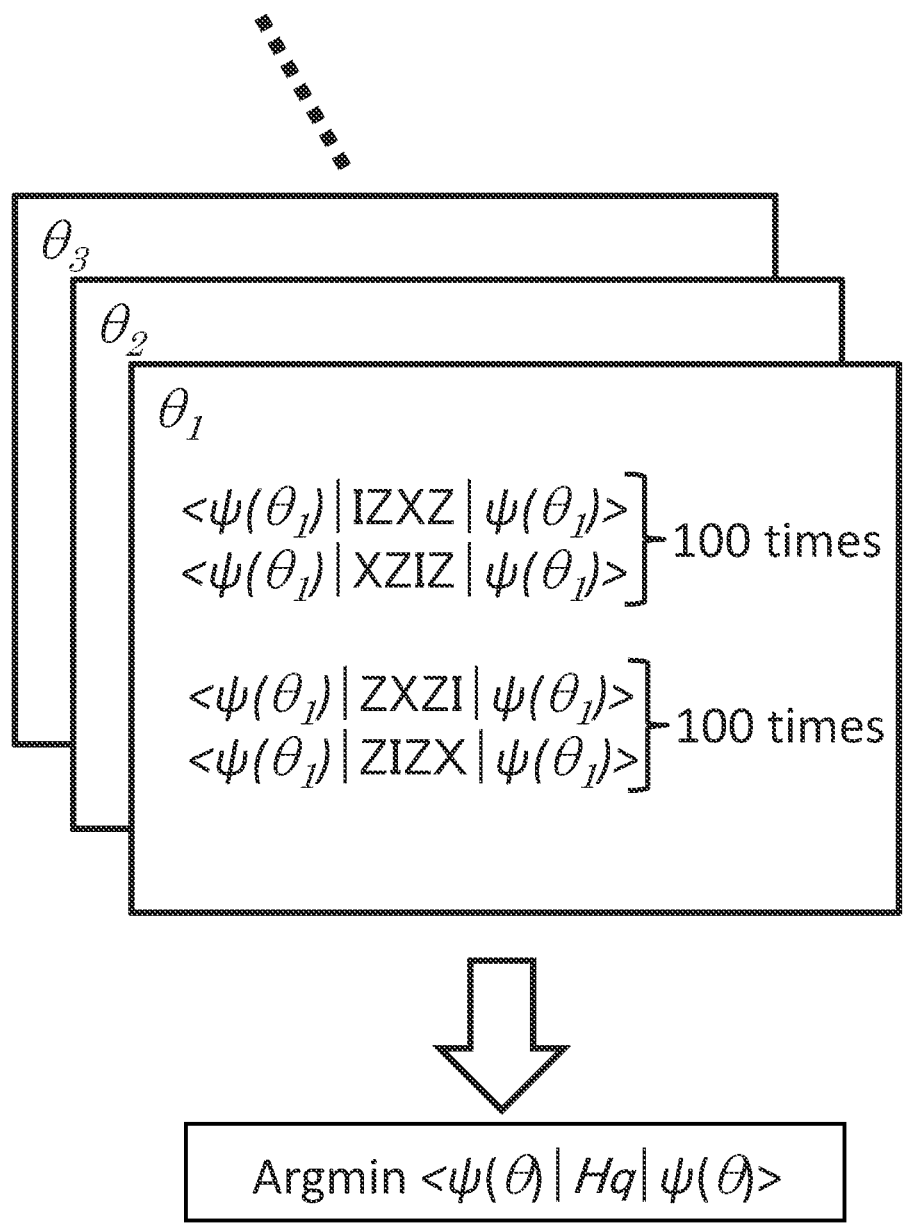
FIG. 3 shows an example of a process of improved VQE according to an embodiment of the present invention.

FIG. 3 shows an example of a process of improved VQE according to an embodiment of the present invention. In an example of FIG. 3, a quantum computer executes 100 computations of each Pauli string (IZXZ and ZXZI) for $\theta_1$, and thus performs 200 quantum computations total. In this example, the quantum computer may perform the computation of XZIZ at the same time as IZXZ, perform the computation of ZXZI at the same time as ZIZX, and does not perform computation of XXXX.

Thereby, according to the example, the quantum computer can reduce the number of quantum computations by $\frac{2}{5}$ compared to the example of FIG. 1. Thereby, the number of the quantum circuits may be reduced.

Figure 4:
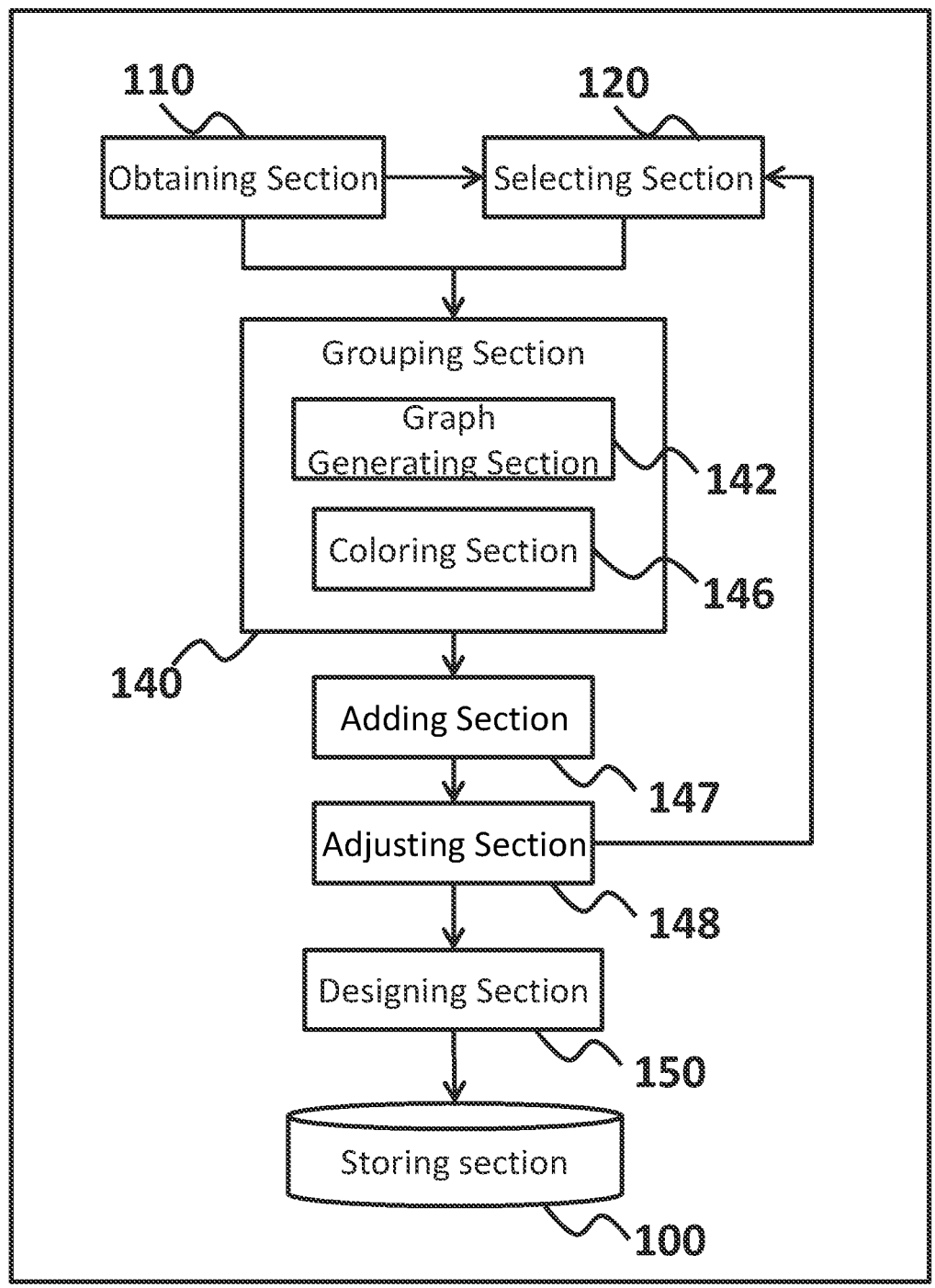
FIG. 4 shows an exemplary configuration of an apparatus.

FIG. 4 shows an exemplary configuration of an apparatus 10, according to an embodiment of the present invention. The apparatus 10 may discard some Pauli strings in the qubit Hamiltonian according to an influence of each Pauli string, and thereby accelerate VQE with a minimum and/or allowable loss of accuracy.

The apparatus 10 may include a processor and/or programmable circuitry. The apparatus 10 may further include one or more computer readable mediums collectively including instructions. The instructions may be embodied on the computer readable medium and/or the programmable circuitry. The instructions, when executed by the processor or the programmable circuitry, may cause the processor or the programmable circuitry to operate as a plurality of operating sections.

Thereby, the apparatus 10 may be regarded as including a storing section 100, an obtaining section 110, a selecting section 120, a grouping section 140, an adding section 147, an adjusting section 148, and a designing section 150.

The storing section 100 stores information used for the processing that the apparatus 10 performs. The storing section 100 may also store a variety of data/instructions used for operations of the apparatus 10. One or more other elements in the apparatus 10 (e.g., the obtaining section 110, the selecting section 120, the grouping section 140, the adding section 147, the adjusting section 148, and the designing section 150) may communicate data directly or via the storing section 100, as necessary.

The storing section 100 may be implemented by a volatile or non-volatile memory of the apparatus 10. In some embodiments, the storing section 100 may store Pauli strings, coefficients, and other data related thereto.

The obtaining section 110 may receive a qubit Hamiltonian $H_q$ representing a linear combination of a plurality of Pauli strings. In an embodiment, the obtaining section 110 may receive a plurality of Pauli strings and coefficients for each Pauli string in $H_q$. For example, the obtaining section may obtain Pauli strings "IZXZ", "ZXZI", "XXXX", "ZIZX", "XZIZ" and coefficients a, b, c, d, e in the above Expression 1. The obtaining section 110 may provide the selecting section 120 and the grouping section 140 with the qubit Hamiltonian $H_q$.

The selecting section 120 may select, among the plurality of Pauli strings, one or more Pauli strings that have less influence than a threshold on an eigenvalue of the qubit Hamiltonian $H_q$. In an embodiment, the influence of a Pauli string on an eigenvalue may be a coefficient of a Pauli string in a qubit Hamiltonian $H_q$.

In this embodiment, the selecting section 120 may select one or more Pauli strings that have less absolute value of coefficient in the qubit Hamiltonian $H_q$ than a coefficient threshold. Hereinafter, a Pauli string that is selected by the selecting section 120 may be referred to as a "selected Pauli string" while a Pauli string that is not selected by the selecting section 120 may be referred to as an "unselected Pauli string."

The grouping section 140 may group some of the Pauli strings in the qubit Hamiltonian $H_q$. In an embodiment, the grouping section 140 may group unselected Pauli strings, among the plurality of Pauli strings, into a plurality of groups of jointly measurable Pauli strings. The grouping section 140 may perform the grouping based on joint measurability of Pauli strings. The grouping section 140 may comprise a graph generating section 142 and a coloring section 146.

The graph generating section 142 may generate a Pauli graph that includes the unselected Pauli strings as nodes of the Pauli graph. Each node in the Pauli graph corresponds to each of the unselected Pauli strings. The graph generating section 142 may connect two nodes via an edge when two Pauli strings corresponding to the two nodes are not jointly measurable observables by Tensor Product Basis (or TPB) measurement. Details of generation of Pauli graph is explained below.

The coloring section 146 may group nodes in the Pauli graph such that nodes not connected via an edge belong to the same group. Thereby, the coloring section 146 may generate a plurality of groups of the unselected Pauli strings. In an embodiment, the coloring section 146 may perform the grouping by a coloring algorithm.

The adding section 147 may add some selected Pauli strings to a group made by the coloring section 146, based on joint measurability. In an embodiment, the adding section 147 may determine whether at least one of the selected one or more Pauli strings is jointly measurable by TPB with Pauli strings in one of the plurality of groups.

Then, the adding section 147 may add at least one of the one or more selected Pauli strings to the one of the plurality of groups, in response to determining that the at least one of the selected one or more Pauli strings is jointly measurable with Pauli strings in one of the plurality of groups.

The adjusting section 148 may adjust the threshold used by the selecting section 120. In an embodiment, the adjusting section 148 may calculate an estimated error from discarded Pauli strings. The discarded Pauli strings are the selected Pauli strings that have not been added to the one of the plurality of groups by the adding section 147.

In an embodiment, the adjusting section 148 may adjust the threshold when the estimated error is greater than allowable. The adjusting section 148 may provide the selecting section 120 with the adjusted threshold as a new threshold.

The designing section 150 may design a quantum circuit based on a Pauli graph generated from the adding section 147.

Figure 5:
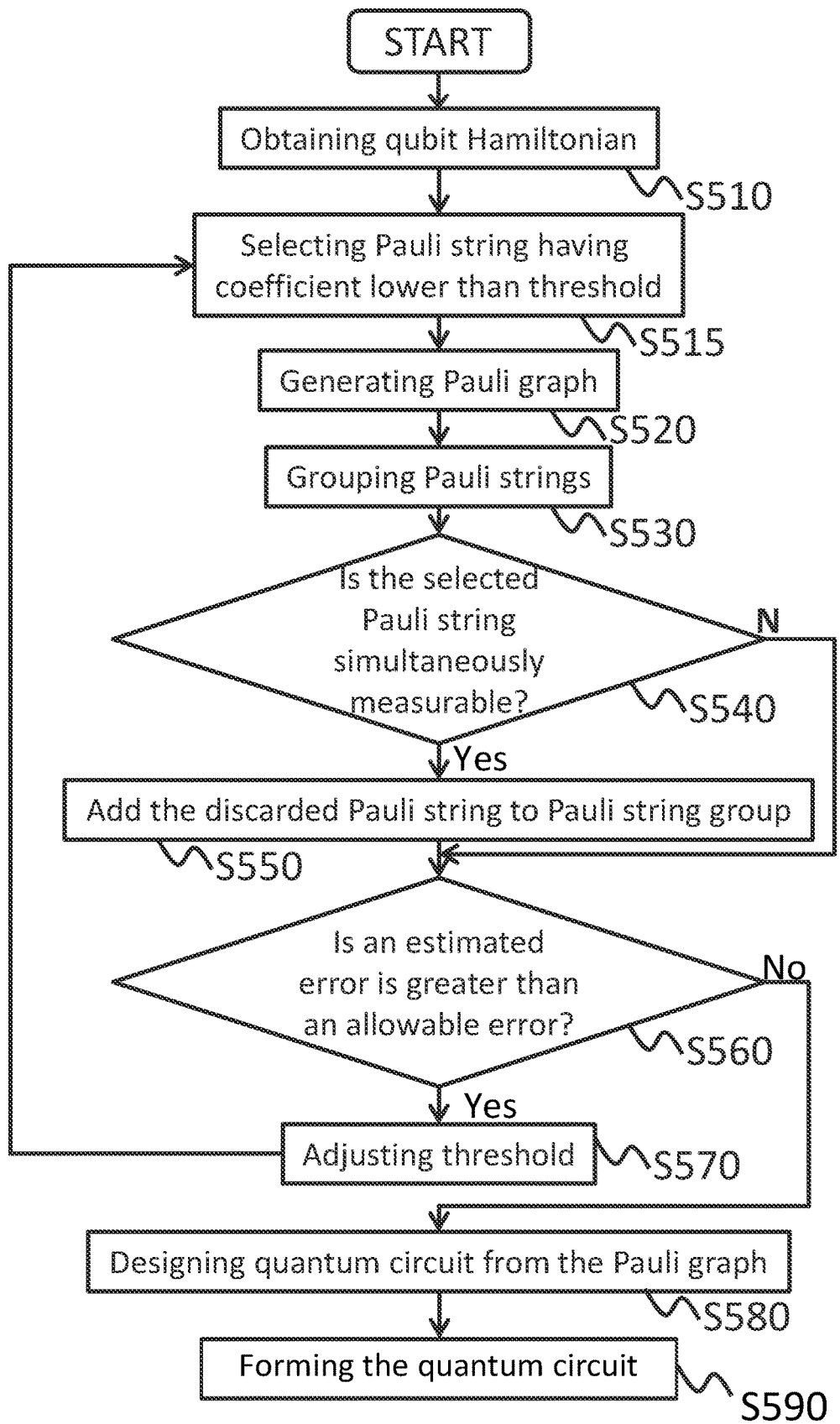
FIG. 5 shows a first operational flow according to an embodiment of the present invention.

FIG. 5 shows a first operational flow according to an embodiment of the present invention. The present embodiment describes an example in which an apparatus, such as the apparatus 10, performs operations from S510 to S590, as shown in FIG. 5, to group a plurality of Paul strings and design a quantum circuit based on the groups.

At S510, an obtaining section, such as the obtaining section 110, may receive a qubit Hamiltonian $H_q$. In an embodiment, the obtaining section may obtain a plurality of Pauli strings and coefficients of the plurality of Pauli strings.

Figure 6:
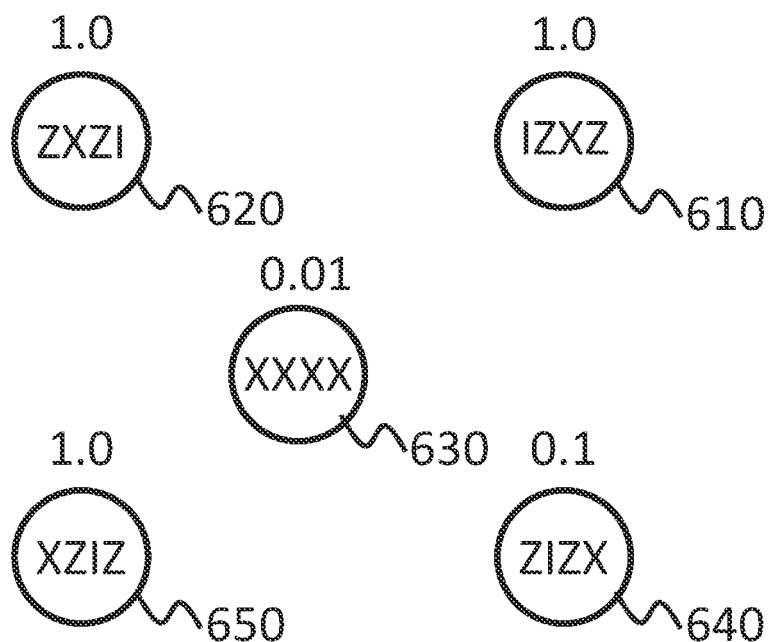
FIG. 6 shows Pauli strings in a qubit Hamiltonian according to an embodiment of the present invention.

FIG. 6 shows Pauli strings in a qubit Hamiltonian according to an embodiment of the present invention. In the embodiment of FIG. 6, the obtaining section may obtain Pauli strings "IZXZ", "ZXZI", "XXXX", "ZIZX", and "XZIZ" represented as nodes 610-650. As shown in the figure, coefficients of "IZXZ", "ZXZI", "XXXX", "ZIZX", and "XZIZ." are "1.0", "1.0", "0.01", "0.1", and "1.0."

At S515, a selecting section such as the selecting section 120 may select one or more Pauli strings that have less influence than a threshold on an eigenvalue of the qubit Hamiltonian $H_q$. The selecting section may select Pauli strings among the plurality of Pauli strings received at S510. In an embodiment, the threshold may be a coefficient threshold, and the selecting section may select one or more Pauli strings that have less absolute value of coefficient in the qubit Hamiltonian than the coefficient threshold.

In an embodiment, the selecting section may preliminarily determine the coefficient threshold. In the embodiment, the selecting section may preliminarily determine the coefficient threshold based on quantile of absolute value of coefficients of the plurality of Pauli strings in the qubit Hamiltonian $H_q$. In a specific embodiment, a coefficient threshold may be an average, quartile, or median value in absolute values of coefficients of the plurality of Pauli strings in the qubit Hamiltonian $H_q$.

Figure 7:
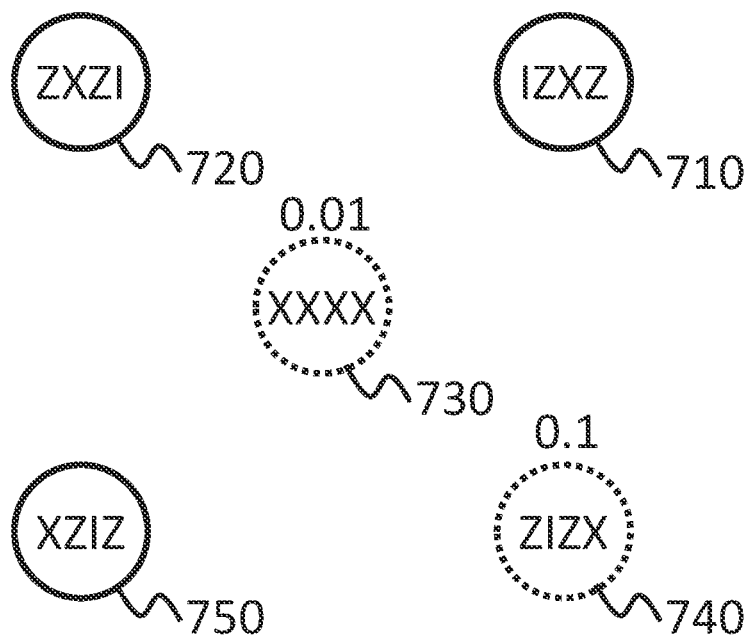
FIG. 7 shows remaining Pauli strings according to an embodiment of the present invention.

FIG. 7 shows remaining Pauli strings according to an embodiment of the present invention. Nodes 710-750 may correspond to the nodes 610-650 in FIG. 6. In an embodiment of FIG. 7, the selecting section may select Pauli strings "XXXX" and "ZIZX", of which absolute values of coefficients are less than the coefficient threshold 0.2. As a result, unselected Pauli strings are "IZXZ", "ZXZI", and "XZIZ."

At S520, a graph generating section, such as the graph generating section 142, may generate a Pauli graph from the unselected Paul strings. In an embodiment, the graph generating section may generate a Pauli graph including a plurality of nodes representing unselected Pauli strings.

The graph generating section may generate a Pauli graph by connecting the plurality of nodes by edges. The graph generating section may connect between a first node corresponding to a first Pauli string and a second node corresponding to a second Pauli string by an edge, in response to determining that the first Pauli string and the second Pauli string are not jointly measurable observables by TPB.

Figure 8:
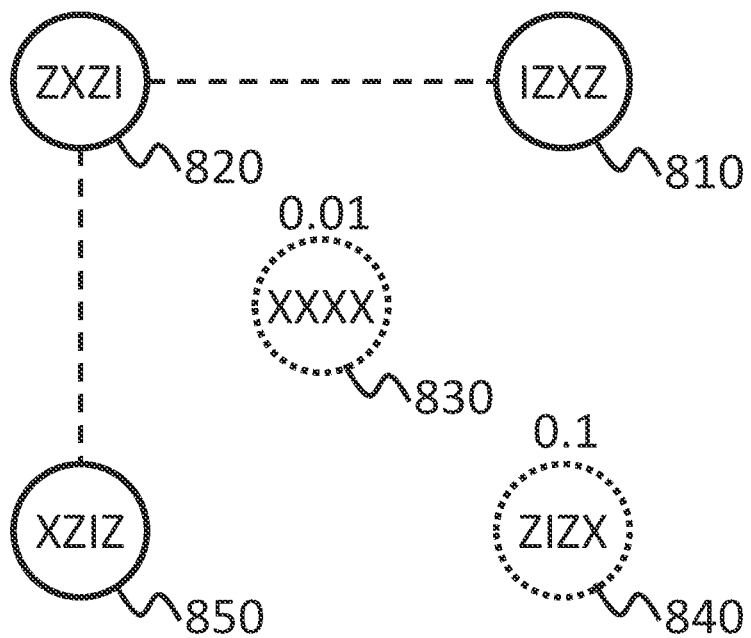
FIG. 8 shows a Pauli graph according to an embodiment of the present invention.

FIG. 8 shows a Pauli graph according to an embodiment of the present invention. Nodes 810-850 may correspond to the nodes 710-750 in FIG. 7. The graph generating section may generate the Pauli graph in FIG. 8 from the unselected Pauli strings in FIG. 7.

The graph generating section may determine that Pauli operators are jointly measurable observables by TPB when compared operators are identical (e.g., X and X, Y and Y, or Z and Z) or when one of compare operators is I (e.g., X and I, Y and I, or Z and I). In an embodiment, the graph generating section may determine that Pauli strings are jointly measurable by TPB when ALL operators in the Pauli strings are jointly measurable observables.

For example, ZXZI and IZXZ may be jointly measurable by TPB at the first letter (Z and I) and at the fourth letter (I and Z) while they may not be jointly measurable by TPB at the second letter (X and Z) and at the third letter (Z and X). As a whole, ZXZI and IZXZ may be determined as not jointly measurable by TPB. Thus, the graph generating section may connect the node 820 (ZXZI) and the node 810 (IZXZ) by an edge.

Meanwhile XZIZ and IZXZ may be jointly measurable by TPB all at the first letter (X and I), the second letter (Z and Z), the third letter (I and X), and at the fourth letter (Z and Z). Thus, the graph generating section may refrain from connecting a node 850 (XZIZ) and a node 810 (IZXZ) by an edge.

At S530, a coloring section, such as the coloring section 146, may group nodes in the Pauli graph generated at S520. The coloring section may generate a plurality of groups of nodes such that nodes not connected by an edge may belong to the same group. Thereby, the coloring section may generate a plurality of groups of the unselected Pauli strings.

The coloring section may perform the grouping so as to minimize the number of groups. In an embodiment, the coloring section may perform the grouping by implementing a known coloring algorithm, which solves graph coloring problems.

Figure 9:
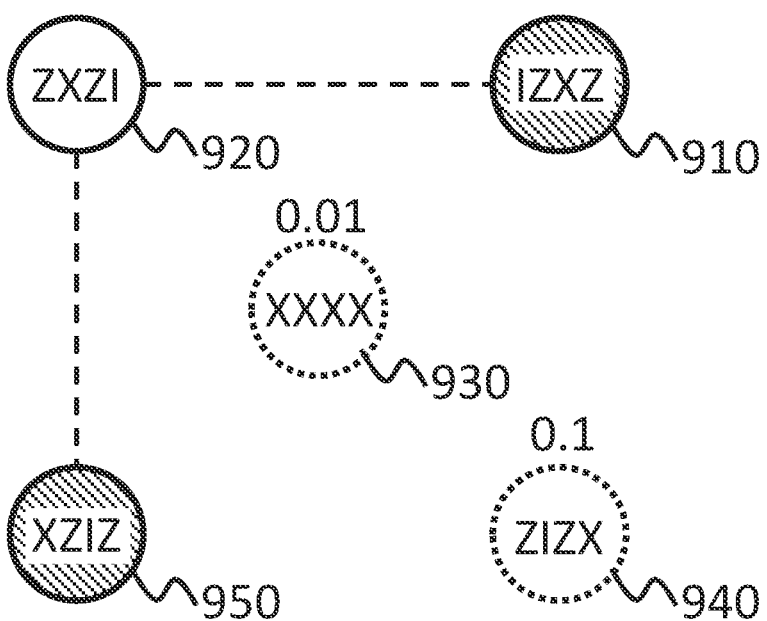
FIG. 9 shows grouped Pauli strings according to an embodiment of the present invention.

FIG. 9 shows grouped Pauli strings according to an embodiment of the present invention. Nodes 910-950 may correspond to the nodes 810-850 in FIG. 8. The coloring section may perform the grouping as shown in FIG. 9 from the Pauli graph of FIG. 8. For example, the node 910 (IZXZ) is not connected to the node 950 (XZIZ), while the node 920 (ZXZI) connects both of the node 910 and the node 950. Thus, the coloring section may generate a first group including IZXZ and XZIZ, and a second group including ZXZI. In FIG. 9, the nodes of the first group are shown by hatched circles.

At S540, an adding section, such as the adding section 147, may determine whether one or more of the selected Pauli strings is jointly measurable with the Pauli strings in one of the plurality of groups generated at S530. In an embodiment, the adding section may determine whether one or more of the selected Pauli strings is jointly measurable by TPB.

In an example of FIG. 9, the selected Pauli strings are XXXX corresponding to the node 930 and ZIZX corresponding to the node 940. The adding section may determine that the selected Pauli string XXXX is not jointly measurable with the Pauli string IZXZ nor the Pauli string XZIZ in the first group, nor the Pauli string ZXZI in the second group. The adding section may further determine that the selected Pauli string ZIZX is jointly measurable with the Pauli string ZXZI in the second group by TPB.

If the adding section finds at least one selected node that is jointly measurable, the adding section may proceed with an operation of S550, and if not proceed with S560. Hereinafter, the selected Pauli string that is jointly measurable may be referred to as "restored Pauli string", and a group that includes a Pauli string jointly measurable with the restored Pauli string may be referred to as "restored group."

At S550, the adding section may add at least one restored Pauli string to the restored group. Thereby at least some of the selected Pauli graphs are added back to the Pauli graph without increasing a number of the groups.

Figure 10:
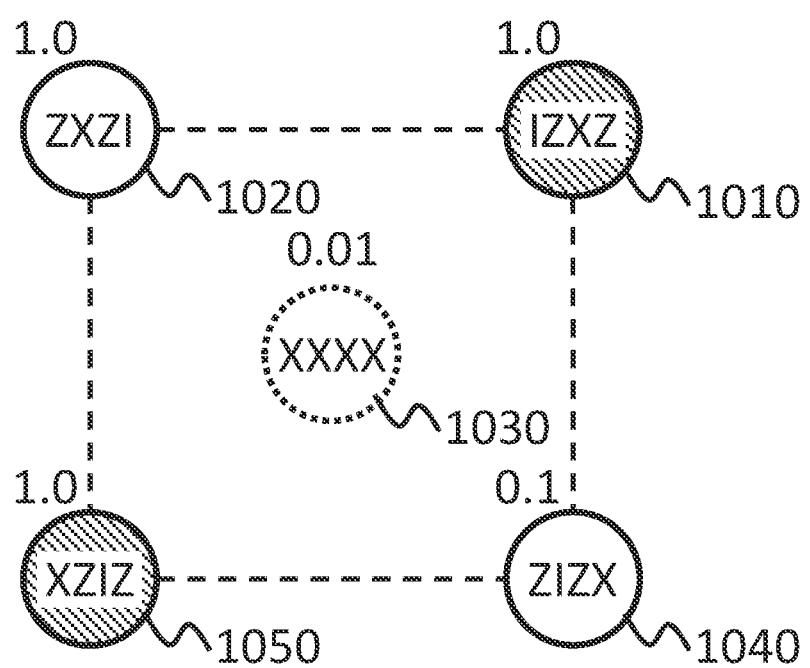
FIG. 10 shows restored Pauli strings according to an embodiment of the present invention.

FIG. 10 shows restored Pauli strings according to an embodiment of the present invention. Nodes 1010-1050 may correspond to the nodes 910-950 in FIG. 9. The adding section may add a selected Pauli string to the Pauli graph of FIG. 9, to form a Pauli graph as shown in FIG. 10. In the example, the adding section may add the Pauli string XIZX to the second group, which includes the Pauli string "ZXZI."

At S560, an adjusting section, such as the adjusting section 148, may determine whether an estimated error is greater than an allowable error. First, the adjusting section may calculate an estimated error from discarded Pauli strings. In an embodiment, the adjusting section may calculate a sum of absolute values of coefficients of the discarded Pauli strings as the estimated error.

In an embodiment of FIG. 10, the only discarded Pauli string is the Pauli string XXXX. In the embodiment, the adjusting section may calculate that the estimated error is 0.01, which is the sum of the absolute values of the coefficients of the discarded Pauli strings.

In an embodiment, the adjusting section may calculate the estimated error by further using at least Gershgorin circle. According to Gershgorin circle, an eigenvalue $\lambda$ of the qubit Hamiltonian $H_q$ satisfies an equation: $|\lambda - \alpha_{ii}| \leq \Sigma_{j \neq i} |\alpha_{ij}|$, where $a_{ij}$ is an i,j entry of $H_q$. In the embodiment, the adjusting section may calculate the estimated error by using a range of $\lambda$ of $H_q$ where no Pauli string is discarded and a range of $\lambda$ of $H_q$ where one or more Pauli strings are discarded.

Then, the adjusting section may determine whether the estimated error is greater than the allowable error. In an embodiment, the adjusting section may determine whether the estimated error is greater than a first error threshold. The first error threshold may be preliminarily set before starting the operational flow. If the estimated error is greater than the first error threshold, then the adjusting section may proceed with an operation of S570, and if not the adjusting section may proceed with an operation of S580.

At S570, the adjusting section may adjust the threshold used by the selecting section at S515. In an embodiment, the adjusting section may decrease the threshold, such as the coefficient threshold. Then, the apparatus returns to the operation of S515.

At another operation of S515, the selecting section may again select Pauli strings based on the threshold adjusted at S570. Thereby, the apparatus may avoid selecting too many Pauli strings, when the estimated error due to the discarded Pauli strings is larger than allowable.

At S580, a designing section such as the designing section 150 may design a quantum circuit based the latest Pauli graph. In an embodiment, the designing section may generate a layout of a quantum circuit by using a Pauli graph generated from the adding section at the latest S550. Thereby, the designing section may use at least the plurality of groups of jointly measurable Pauli strings.

The designing section may design a respective quantum circuit for each group in the Pauli graph. Jointly measurable Pauli strings can share a quantum circuit, and Pauli strings in the same group in the Pauli graph can be jointly measurable. Therefore, only one quantum circuit is needed for each group in the Pauli graph. For example, when the Pauli graph includes two groups, the designing section may generate a layout of two quantum circuits for the qubit Hamiltonian $H_q$.

At S590, a designing section, such as the designing section 150, may form a quantum circuit based on the quantum circuit design. In an embodiment, the designing section may form the quantum circuit based on a previously generated quantum circuit layout. In an embodiment, the designing section may form a quantum circuit in either software or hardware. The designing section may form a quantum circuit for each group in a Pauli graph.

In an embodiment of FIG. 10, the designing section may generate layouts of a first quantum circuit for the first group including the Pauli strings IZXZ and XZIZ, and a second quantum circuit for the second group including the Pauli strings ZXZI and ZIZX.

As explained, according to the embodiments above, the apparatus may eliminate Pauli strings with coefficients having small absolute values from a Pauli graph. Thereby the apparatus may efficiently generate the Pauli graph with a less number of Pauli strings at S520. Then the apparatus may, if possible, restore the eliminated Pauli string to the Pauli graph such that the eliminated Pauli string is jointly measurable with at least one of the existing Pauli strings in the Pauli graph. Since the restored Pauli string belongs to the existing group, the restored Pauli string does not increase the number of the quantum circuits. Thereby, the apparatus may reduce the number of quantum circuits in VQE while minimizing the loss of accuracy of VQE. In other words, the apparatus may reduce quantum computation needed for VQE without sacrificing the accuracy to a great degree.

In the embodiment of FIGS. 5-10, the adjusting section may decrease the coefficient threshold in response to determining that the estimated error is greater than a first error threshold during S560 and S570. In addition or alternative to this embodiment, the adjusting section may raise the coefficient threshold, in response to determining that the estimated error is smaller than a second error threshold.

In the embodiments above, the grouping section may use groups of jointly measurable observables identified by TPB during S520-530. In embodiments explained below, the grouping section may further use groups of jointly measurable observables identified by entangled measurements such as Bell measurement.

Figure 11:
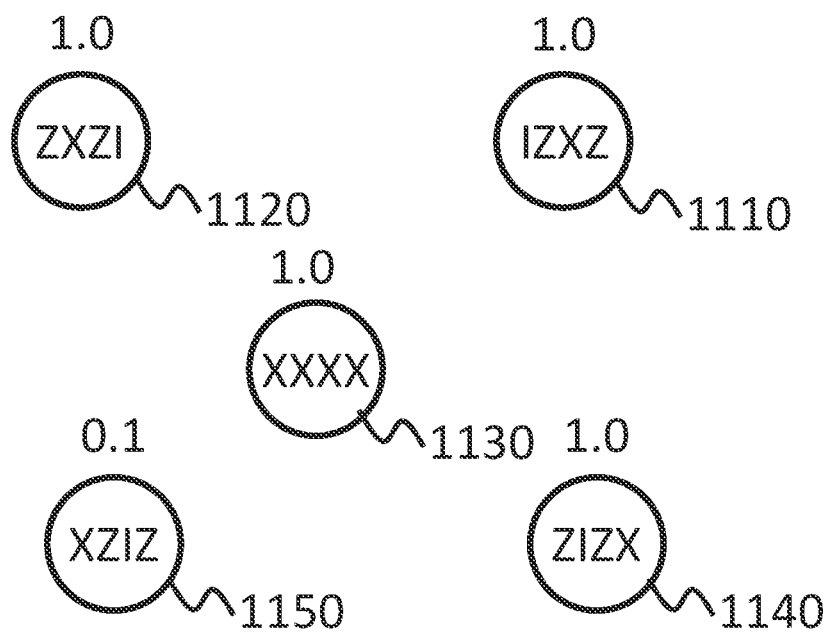
FIG. 11 shows Pauli strings in a qubit Hamiltonian according to an embodiment of the present invention.

FIG. 11 shows Pauli strings in a qubit Hamiltonian according to an embodiment of the present invention. In the embodiment of FIG. 11, the obtaining section may obtain Pauli strings "IZXZ", "ZXZI", "XXXX", "ZIZX", and "XZIZ" represented as nodes 1110-1150. As shown in the figure, coefficients of "IZXZ", "ZXZI", "XXXX", "ZIZX", and "XZIZ." are "1.0", "1.0", "1.0", "1.0", and "0.1."

At S510 of FIG. 5, the obtaining section may obtain a qubit Hamiltonian as shown in FIG. 11. At S515, the selecting section may select one or more Pauli strings that have less influence than a threshold (e.g., 0.2).

Figure 12:
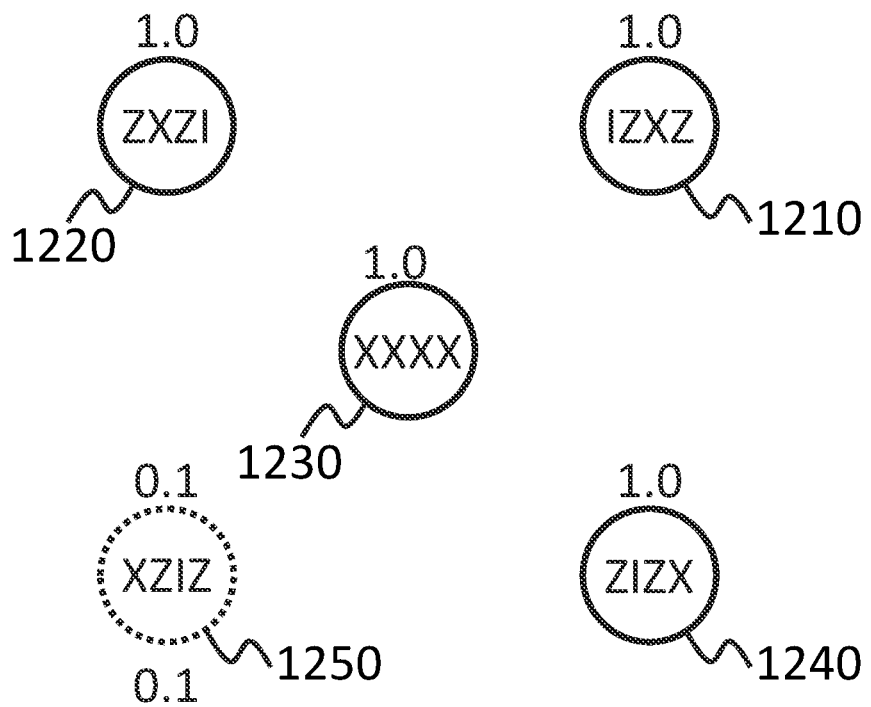
FIG. 12 shows remaining Pauli strings according to an embodiment of the present invention.

FIG. 12 shows remaining Pauli strings according to an embodiment of the present invention. Nodes 1210-1250 may correspond to the nodes 1110-1150 in FIG. 11. In an embodiment of FIG. 12, the selecting section may select Pauli strings "XZIZ", of which absolute value of coefficient is less than the coefficient threshold 0.2. As a result, unselected Pauli strings are "ZXZI", "IZXZ", "XXXX" and "ZIZX."

At S520, the graph generating section may generate a Pauli graph from the unselected Paul strings.

Figure 13:
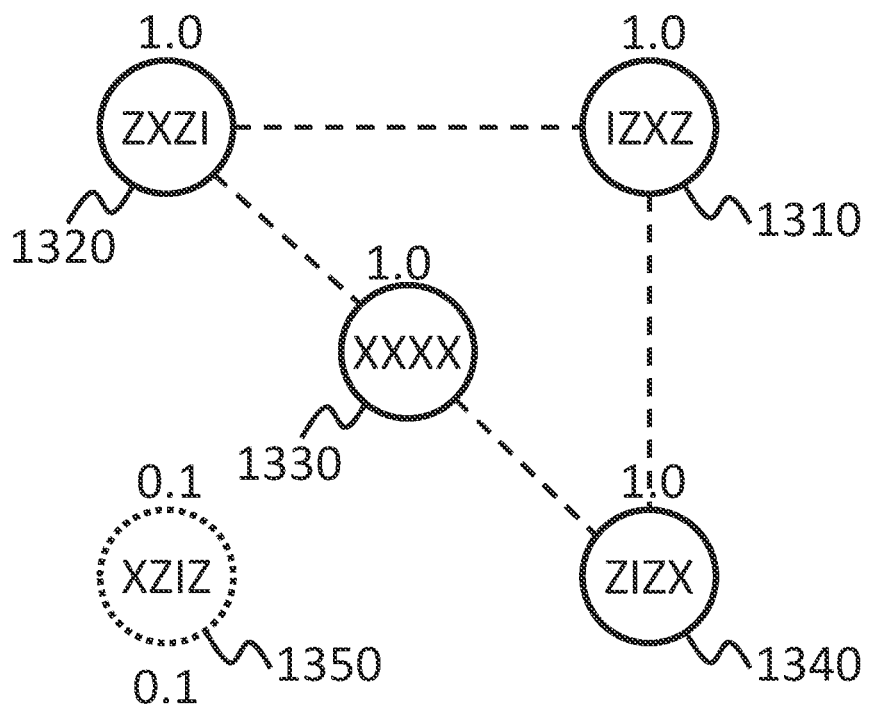
FIG. 13 shows a Pauli graph according to an embodiment of the present invention.

FIG. 13 shows a Pauli graph according to an embodiment of the present invention. Nodes 1310-1350 may correspond to the nodes 1210-1250 in FIG. 12. The graph generating section may generate the Pauli graph in FIG. 13 from the unselected Pauli strings in FIG. 12. The graph generating section may generate the Pauli graph in the same manner as explained in relation to S520.

At S520, the graph generating section may further merge at least some of nodes of the Pauli graph that correspond to Pauli strings jointly measurable by an entangled measurement. In an embodiment, the entangled measurement may be Bell measurement.

In an embodiment, the graph generating section may merge nodes in response to determining that Pauli strings corresponding to the nodes are jointly measurable by an entangled measurement at least in a part of operators and are jointly measurable by TPB at the other operators.

Figure 14:
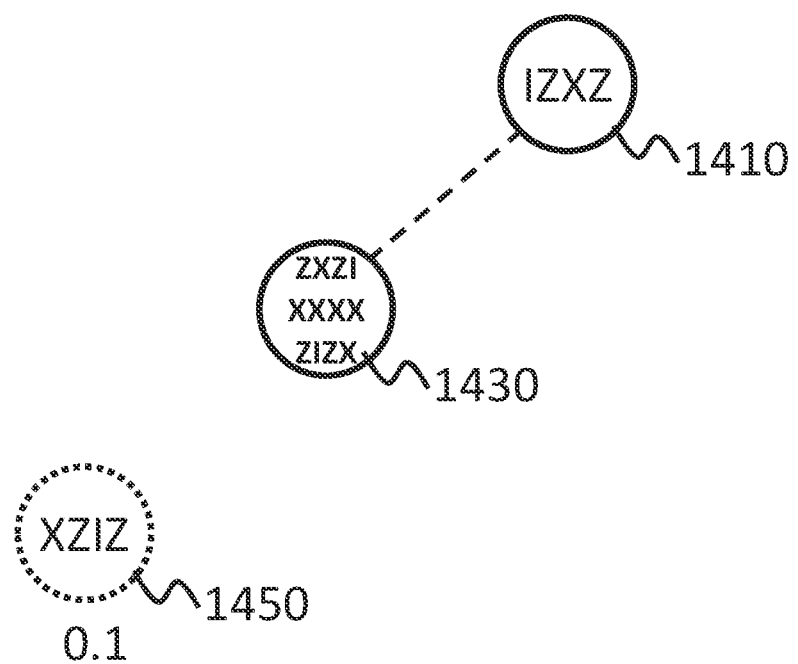
FIG. 14 shows a merged Pauli graph according to an embodiment of the present invention.

FIG. 14 shows a merged Pauli graph according to an embodiment of the present invention. Nodes 1410 and 1450 may correspond to the nodes 1310 and 1350 in FIG. 13. A node 1430 may be a merged node corresponding to the nodes 1320-1340. The graph generating section may generate the merged Pauli graph in FIG. 14 from the Pauli graph in FIG. 13.

In the embodiment of FIG. 14, the first letter and the third letter of ZXZI, XXXX, and ZIZX are (ZZ, XX, ZZ), which are jointly measurable by Bell measurement. In addition, the second letter and the fourth letter of ZXZI, XXXX, and ZIZX are (XI, XX, IX), which are jointly measurable by TPB. Therefore, the graph generating section may merge the nodes corresponding to ZXZI, XXXX, and ZIZX to generate a merged node 1430.

At S530, the coloring section may group nodes in the merged Pauli graph generated at S520.

Figure 15:
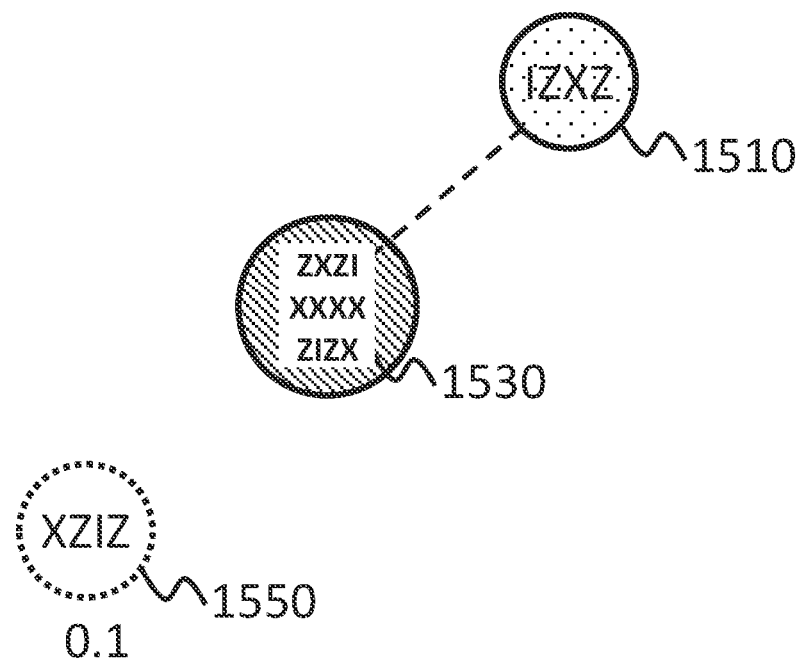
FIG. 15 shows grouped Pauli strings according to an embodiment of the present invention.

FIG. 15 shows grouped Pauli strings according to an embodiment of the present invention. Nodes 1510-1550 may correspond to the nodes 1410-1450 in FIG. 14. The coloring section may perform the grouping as shown in FIG. 15 from the merged Pauli graph of FIG. 14. For example, the coloring section may generate a first group including IZXZ, and a second group including ZXZI, XXXX, and ZIZX. In FIG. 15, the node 1530 in the second group is shown by a hatched circle.

At S540, the adding section may determine whether one or more of selected Pauli strings is jointly measurable with Pauli strings in one of the plurality of groups generated at S530. In an embodiment, the adding section may determine whether one or more of selected Pauli strings is jointly measurable by TPB or the entangled measurement. In an embodiment of FIG. 15, the selected Pauli string XZIZ is jointly measurable with IZXZ by TPB.

At S550, the adding section may add at least one restored Pauli string to the restored group.

Figure 16:
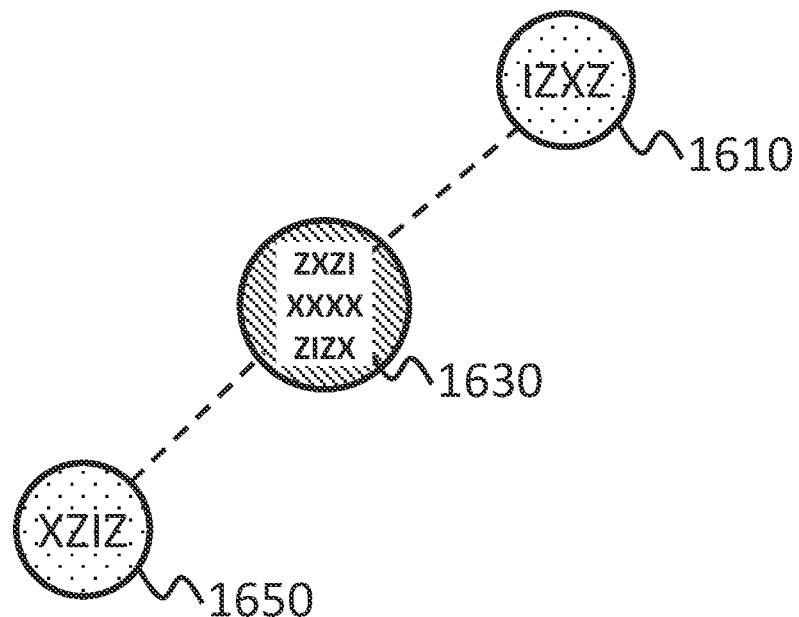
FIG. 16 shows restored Pauli strings according to an embodiment of the present invention.

FIG. 16 shows restored Pauli strings according to an embodiment of the present invention. Nodes 1610-1650 may correspond to the nodes 1510-1550 in FIG. 15. The adding section may add a selected Pauli string to the Pauli graph of FIG. 15, to form a Pauli graph as shown in FIG. 16. In the example, the adding section may add the Pauli string XZIZ to the first group, which includes the Pauli string "IZXZ."

In relation to FIGS. 11-16, embodiments where all Pauli strings in FIG. 11 are finally used, are described for explanation purposes. However, in some embodiments, one or more Pauli strings are eliminated from a resultant Pauli graph to accelerate VQE.

Various embodiments of the present invention may be described with reference to flowcharts and block diagrams whose blocks may represent (1) steps of processes in which operations are performed or (2) sections of apparatuses responsible for performing operations. Certain steps and sections may be implemented by dedicated circuitry, programmable circuitry supplied with computer-readable instructions stored on computer-readable media, and/or processors supplied with computer-readable instructions stored on computer-readable media. Dedicated circuitry may include digital and/or analog hardware circuits and may include integrated circuits (IC) and/or discrete circuits. Programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server.

In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s).

In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 17:
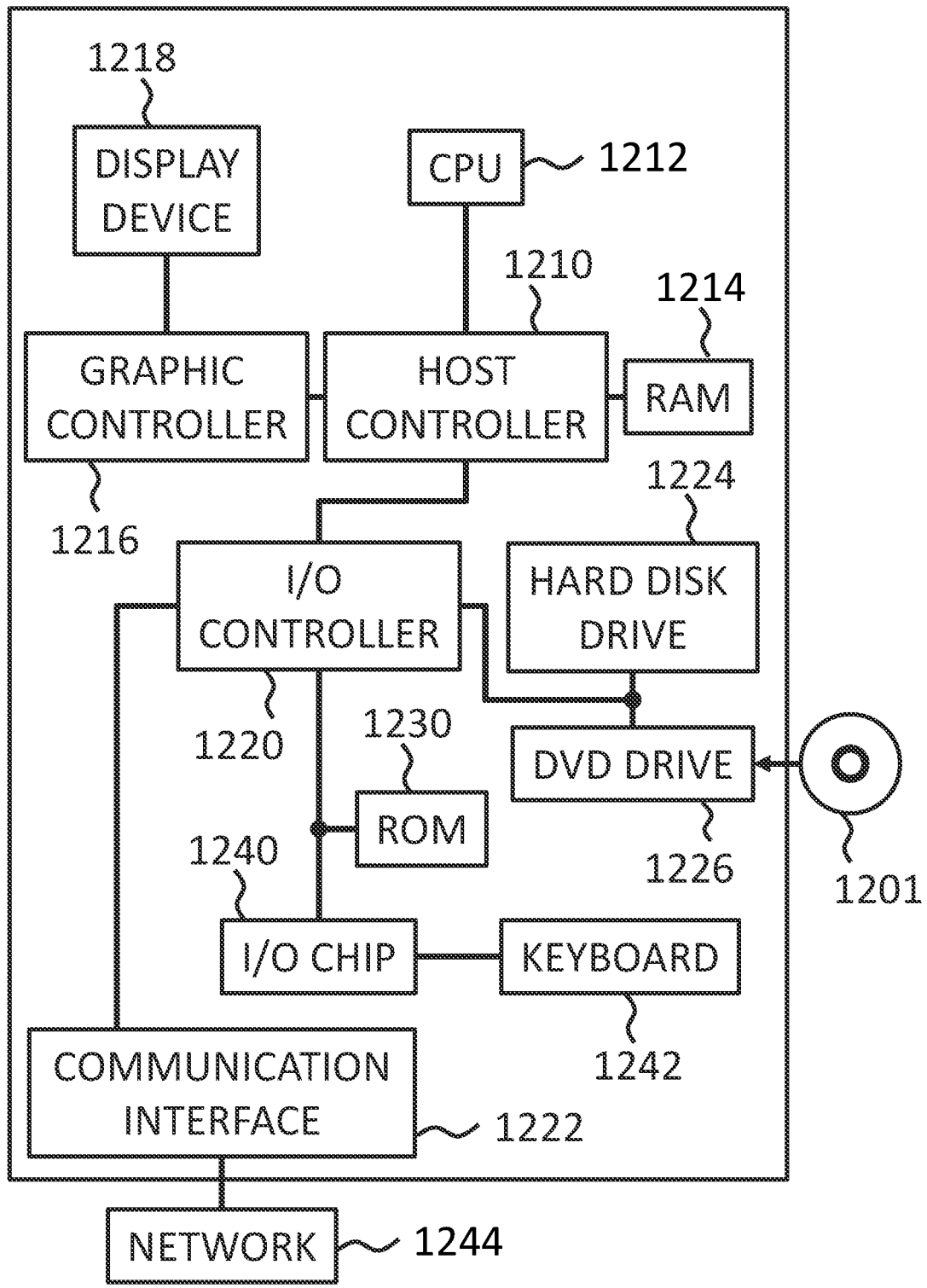
FIG. 17 shows an exemplary hardware configuration of a computer that functions as a system, according to an embodiment of the present invention.

FIG. 17 shows an example of a computer 1200 in which aspects of the present invention may be wholly or partly embodied. A program that is installed in the computer 1200 can cause the computer 1200 to function as or perform operations associated with apparatuses of the embodiments of the present invention or one or more sections thereof, and/or cause the computer 1200 to perform processes of the embodiments of the present invention or steps thereof. Such a program may be executed by the CPU 1212 to cause the computer 1200 to perform certain operations associated with some or all of the blocks of flowcharts and block diagrams described herein.

The computer 1200 according to the present embodiment includes a CPU 1212, a RAM 1214, a graphics controller 1216, and a display device 1218, which are mutually connected by a host controller 1210. The computer 1200 also includes input/output units such as a communication interface 1222, a hard disk drive 1224, a DVD-ROM drive 1226 and an IC card drive, which are connected to the host controller 1210 via an input/output controller 1220. The computer also includes legacy input/output units such as a ROM 1230 and a keyboard 1242, which are connected to the input/output controller 1220 through an input/output chip 1240.

The CPU 1212 operates according to programs stored in the ROM 1230 and the RAM 1214, thereby controlling each unit. The graphics controller 1216 obtains image data generated by the CPU 1212 on a frame buffer or the like provided in the RAM 1214 or in itself, and causes the image data to be displayed on the display device 1218.

The communication interface 1222 communicates with other electronic devices via a network 1244. The hard disk drive 1224 stores programs and data used by the CPU 1212 within the computer 1200. The DVD-ROM drive 1226 reads the programs or the data from the DVD-ROM 1201, and provides the hard disk drive 1224 with the programs or the data via the RAM 1214. The IC card drive reads programs and data from an IC card, and/or writes programs and data into the IC card.

The ROM 1230 stores therein a boot program or the like executed by the computer 1200 at the time of activation, and/or a program depending on the hardware of the computer 1200. The input/output chip 1240 may also connect various input/output units via a parallel port, a serial port, a keyboard port, a mouse port, and the like to the input/output controller 1220.

A program is provided by computer readable media such as the DVD-ROM 1201 or the IC card. The program is read from the computer readable media, installed into the hard disk drive 1224, RAM 1214, or ROM 1230, which are also examples of computer readable media, and executed by the CPU 1212. The information processing described in these programs is read into the computer 1200, resulting in cooperation between a program and the above-mentioned various types of hardware resources. An apparatus or method may be constituted by realizing the operation or processing of information in accordance with the usage of the computer 1200.

For example, when communication is performed between the computer 1200 and an external device, the CPU 1212 may execute a communication program loaded onto the RAM 1214 to instruct communication processing to the communication interface 1222, based on the processing described in the communication program. The communication interface 1222, under control of the CPU 1212, reads transmission data stored on a transmission buffering region provided in a recording medium such as the RAM 1214, the hard disk drive 1224, the DVD-ROM 1201, or the IC card, and transmits the read transmission data to a network 1244 or writes reception data received from a network 1244 to a reception buffering region or the like provided on the recording medium.

In addition, the CPU 1212 may cause all or a necessary portion of a file or a database to be read into the RAM 1214, the file or the database having been stored in an external recording medium such as the hard disk drive 1224, the DVD-ROM drive 1226 (DVD-ROM 1201), the IC card, etc., and perform various types of processing on the data on the RAM 1214. The CPU 1212 may then write back the processed data to the external recording medium.

Various types of information, such as various types of programs, data, tables, and databases, may be stored in the recording medium to undergo information processing. The CPU 1212 may perform various types of processing on the data read from the RAM 1214, which includes various types of operations, processing of information, condition judging, conditional branch, unconditional branch, search/replace of information, etc., as described throughout this disclosure and designated by an instruction sequence of programs, and writes the result back to the RAM 1214. In addition, the CPU 1212 may search for information in a file, a database, etc., in the recording medium. For example, when a plurality of entries, each having an attribute value of a first attribute associated with an attribute value of a second attribute, are stored in the recording medium, the CPU 1212 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The above-explained program or software modules may be stored in the computer readable media on or near the computer 1200. In addition, a recording medium such as a hard disk or a RAM provided in a server system connected to a dedicated communication network 1244 or the Internet can be used as the computer readable media, thereby providing the program to the computer 1200 via the network 1244.

While the embodiments of the present invention have been described, the technical scope of the invention is not limited to the above described embodiments. It will be apparent to persons skilled in the art that various alterations and improvements can be added to the above-described embodiments. It should also apparent from the scope of the claims that the embodiments added with such alterations or improvements are within the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A computer-implemented method, comprising:
   selecting, among a plurality of Pauli strings, one or more Pauli strings that have less influence than a threshold on an eigenvalue of a qubit Hamiltonian;
   grouping, based on joint measurability, unselected Pauli strings among the plurality of Pauli strings into a plurality of groups of jointly measurable Pauli strings;

adding at least one of the selected one or more Pauli strings to one of the plurality of groups based on joint measurability with Pauli strings in the one of the plurality of groups; and generating a layout of a quantum circuit by using at least the plurality of groups of jointly measurable Pauli strings.

2. The method of claim 1, wherein the selecting one or more Pauli strings includes:

selecting one or more Pauli strings that have less absolute value of coefficient in the qubit Hamiltonian than a coefficient threshold.

3. The method of claim 2, further comprising:

determining the coefficient threshold based at least in part on quantile of coefficients of the plurality of Pauli strings in the qubit Hamiltonian.

4. The method of claim 2, further comprising:

calculating an estimated error from discarded Pauli strings, the discarded Pauli strings being Pauli strings among the selected one or more Pauli strings that have not been added to the one of the plurality of groups;

determining that the estimated error is greater than a first error threshold; and decreasing the coefficient threshold.

5. The method of claim 2, further comprising:

calculating an estimated error from discarded Pauli strings, where the discarded Pauli strings are the selected one or more Pauli strings that have not been added to the one of the plurality of groups, determining that the estimated error is smaller than a second error threshold, and raising the coefficient threshold.

6. The method of claim 5, wherein the calculating the estimated error includes:

calculating a sum of absolute values of coefficients of the discarded Pauli strings.

7. The method of claim 6, wherein the calculating the estimated error is performed by using at least a Gershgorin circle.

8. The method of claim 1, wherein the grouping the unselected Pauli strings is performed by using at least a coloring algorithm.

9. The method of claim 8, wherein the grouping the unselected Pauli strings is performed by further using groups of jointly measurable observables identified by tensor product basis and/or entangled measurements.

10. An apparatus comprising a hardware processor or a programmable circuitry; and one or more computer readable mediums collectively including instructions that, when executed by the processor or the programmable circuitry, cause the processor or the programmable circuitry to perform operations including:

selecting, among a plurality of Pauli strings, one or more Pauli strings that have less influence than a threshold on an eigenvalue of a qubit Hamiltonian;

grouping, based on joint measurability, the unselected Pauli strings among the plurality of Pauli strings into a plurality of groups of jointly measurable Pauli strings;

adding at least one of the selected one or more Pauli strings to one of the plurality of groups based on joint measurability with Pauli strings in the one of the plurality of groups; and generating a layout of a quantum circuit by using at least the plurality of groups of jointly measurable Pauli strings.

11. The apparatus of claim 10, wherein the selecting one or more Pauli strings includes:

selecting one or more Pauli strings that have less absolute value of coefficient in the qubit Hamiltonian than a coefficient threshold.

12. The apparatus of claim 11, wherein the operations further include:

determining the coefficient threshold based at least in part on quantile of coefficients of the plurality of Pauli strings in the qubit Hamiltonian.

13. The apparatus of claim 11, wherein the operations further include:

calculating an estimated error from discarded Pauli strings, the discarded Pauli strings being Pauli strings among the selected one or more Pauli strings that have not been added to the one of the plurality of groups;

determining that the estimated error is greater than a first error threshold; and decreasing the coefficient threshold.

14. The apparatus of claim 10, wherein the grouping the unselected Pauli strings is performed by using at least a coloring algorithm.

15. The apparatus of claim 14, wherein the grouping the unselected Pauli strings is performed by further using groups of jointly measurable observables identified by entangled measurements.

16. A computer program product including one or more computer readable storage mediums collectively storing program instructions that are executable by a processor or programmable circuitry to cause the processor or programmable circuitry to perform operations comprising:

selecting, among a plurality of Pauli strings, one or more Pauli strings that have less influence than a threshold on an eigenvalue of a qubit Hamiltonian;

grouping, based on joint measurability, the unselected Pauli strings among the plurality of Pauli strings into a plurality of groups of jointly measurable Pauli strings;

adding at least one of the selected one or more Pauli strings to one of the plurality of groups based on joint measurability with Pauli strings in the one of the plurality of groups; and generating a layout of a quantum circuit by using at least the plurality of groups of jointly measurable Pauli strings.

17. The computer program product of claim 16, wherein the selecting one or more Pauli strings includes:

selecting one or more Pauli strings that have less absolute value of coefficient in the qubit Hamiltonian than a coefficient threshold.

18. The computer program product of claim 17, wherein the operations further include:

determining the coefficient threshold based at least in part on quantile of coefficients of the plurality of Pauli strings in the qubit Hamiltonian.

19. The computer program product of claim 16, wherein the grouping the unselected Pauli strings is performed by using at least a coloring algorithm.

20. The computer program product of claim 19, wherein the grouping the unselected Pauli strings is performed by further using groups of jointly measurable observables identified by entangled measurements.

* * * * *